United States Patent
Matsuo

(10) Patent No.: US 11,199,812 B2
(45) Date of Patent: Dec. 14, 2021

(54) DIGITAL HOLOGRAPHIC IMAGING APPARATUS

(71) Applicant: OLYMPUS CORPORATION, Hachioji (JP)

(72) Inventor: Keigo Matsuo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/195,352

(22) Filed: Nov. 19, 2018

(65) Prior Publication Data

US 2019/0086865 A1    Mar. 21, 2019

Related U.S. Application Data

(63) Continuation of application No. PCT/JP2016/065615, filed on May 26, 2016.

(51) Int. Cl.
   *G03H 1/04* (2006.01)
   *G03H 1/18* (2006.01)
   (Continued)

(52) U.S. Cl.
   CPC ....... *G03H 1/0486* (2013.01); *G02B 21/0008* (2013.01); *G03H 1/0443* (2013.01);
   (Continued)

(58) Field of Classification Search
   CPC .. F04D 13/022; F04D 13/0606; F04D 13/086; F04D 15/0066; F04D 31/00;
   (Continued)

(56) References Cited

U.S. PATENT DOCUMENTS

| | | | |
|---|---|---|---|
| 9,007,433 B2 | 4/2015 | Ozcan et al. | |
| 2003/0016854 A1* | 1/2003 | Inoue | G06T 5/10 |
| | | | 382/132 |

(Continued)

FOREIGN PATENT DOCUMENTS

| | | |
|---|---|---|
| JP | 2004187163 A | 7/2004 |
| JP | 2013508775 A | 3/2013 |

OTHER PUBLICATIONS

International Preliminary Report on Patentability (IPRP) (and English language translation thereof) and Written Opinion dated Nov. 27, 2018 issued in International Application No. PCT/JP2016/0656615.

(Continued)

*Primary Examiner* — Joon Kwon
(74) *Attorney, Agent, or Firm* — Holtz, Holtz & Volek PC

(57) ABSTRACT

An illumination unit emits an illumination light to a specimen. An image sensor includes multiple pixels arranged in a two-dimensional manner. The image sensor captures an image of the intensity distribution of an interference pattern formed due to the illumination light that has interacted with the specimen, and outputs image data. A defect information acquisition unit acquires defect position information that indicates the positions of defective pixels of the image sensor. A processing unit reconstructs a subject image that represents the specimen based on the image data and the defect position information.

9 Claims, 12 Drawing Sheets

(51) Int. Cl.
  *G02B 21/00*  (2006.01)
  *G03H 1/08*  (2006.01)
  *G03H 1/00*  (2006.01)

(52) U.S. Cl.
  CPC ............ *G03H 1/0866* (2013.01); *G03H 1/182* (2013.01); *G03H 2001/0033* (2013.01); *G03H 2001/0447* (2013.01); *G03H 2001/0452* (2013.01); *G03H 2001/0454* (2013.01); *G03H 2226/02* (2013.01)

(58) Field of Classification Search
  CPC .......... F05D 2260/406; G02B 21/0008; G03H 1/0443; G03H 1/0486; G03H 1/0866; G03H 1/182; G03H 2001/0033; G03H 2001/0447; G03H 2001/0452; G03H 2001/0454; G03H 2226/02
  See application file for complete search history.

(56) References Cited

U.S. PATENT DOCUMENTS

| | | | |
|---|---|---|---|
| 2012/0218379 A1* | 8/2012 | Ozcan | G01N 21/6456 348/40 |
| 2013/0093871 A1* | 4/2013 | Nowatzyk | G02B 21/26 348/79 |
| 2014/0268105 A1* | 9/2014 | Bills | G01N 21/453 356/51 |
| 2015/0070536 A1* | 3/2015 | Sasaki | H04N 5/367 348/246 |

OTHER PUBLICATIONS

International Search Report (ISR) (and English language translation thereof) dated Aug. 30, 2016 issued in counterpart International Application No. PCT/JP2016/065615.

Japanese Office Action (and English language translation thereof) dated Oct. 1, 2019 issued in counterpart Japanese Application No. 2018-518891.

* cited by examiner

ORIGINAL IMAGE

RECONSTRUCTED IMAGE
(WITH DEFECTIVE PIXELS)

RECONSTRUCTED IMAGE
(WITHOUT DEFECTIVE PIXELS)

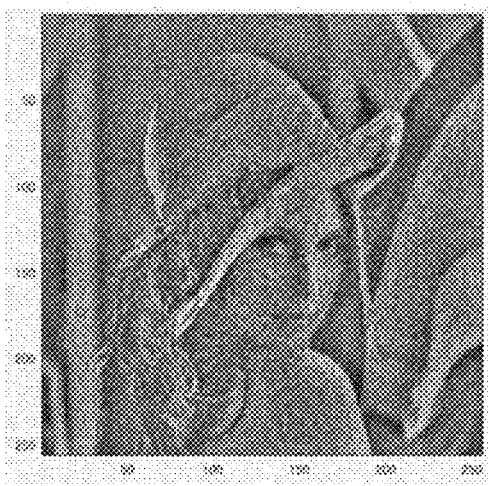
FIG.5A RECONSTRUCTED IMAGE FIRST MODIFIED ALGORITHM
FIG.5B RECONSTRUCTED IMAGE SECOND MODIFIED ALGORITHM
FIG.5C RECONSTRUCTED IMAGE THIRD MODIFIED ALGORITHM
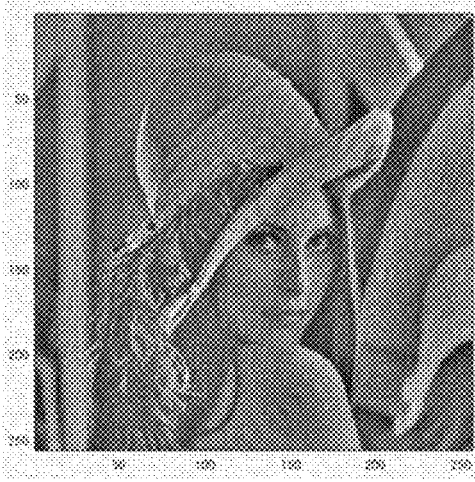
FIG.5D RECONSTRUCTED IMAGE FOURTH MODIFIED ALGORITHM

DIGITAL HOLOGRAPHIC IMAGING APPARATUS

BACKGROUND OF THE INVENTION

1. Field of the Invention

The present invention relates to a digital holographic imaging apparatus.

2. Description of the Related Art

A lens-free digital holographic imaging apparatus is employed in order to capture an image of phase information or intensity information with respect to a cell sample or the like (PCT Patent Publication No. 2013-508775 Japanese Translation). The digital holographic imaging apparatus emits illumination light to a specimen, measures a generated interference pattern by means of an image sensor, and reconstructs the phase information or intensity information by calculation based on the interference pattern.

As a result of investigating such a digital holographic imaging apparatus, the present inventor has come to recognize the following problem.

As a defect of an image sensor, a defective pixel (hot pixel or otherwise dead pixel) is known. With an imaging device such as a digital still camera or video camera in which a subject image is formed on its imaging surface, if there are defective pixels, this leads to missing image information for only a region that corresponds to such defective pixels. This results in local degradation of the image quality. Accordingly, in a case in which such a region is enlarged, such a degradation in the image quality can easily be perceived.

In contrast, if there are defective pixels in a digital holographic imaging apparatus, the effects of such local defective pixels are distributed to a spatially wide area due to reconstruction processing (including propagation calculation). That is to say, with the digital holographic imaging apparatus, such defective pixels lead to the occurrence of degradation in the image quality over a spatially wide area. However, it is difficult to visually recognize the degradation in the image quality. Accordingly, to the knowledge of the present inventor, the requirement of a countermeasure for solving such a problem of degradation in the image quality that occurs in the digital holographic imaging apparatus due to defective pixels has not been pointed out or otherwise has been overlooked.

The present inventor has recognized that the effects of such defective pixels cannot be ignored in reconstruction of the phase distribution of cells or the like in detail. Furthermore, it has been found that, if the reconstruction involves iterative calculation, the effects of defective pixels are emphasized.

SUMMARY OF THE INVENTION

The present invention has been made in view of such a situation. Accordingly, it is an exemplary purpose of an embodiment of the present invention to provide a digital holographic imaging apparatus configured to suppress degradation of image quality.

An embodiment of the present invention relates to a digital holographic imaging apparatus. The digital holographic imaging apparatus comprises: an illumination unit structured to emit an illumination light to a specimen; an image sensor comprising multiple pixels arranged in a two-dimensional manner, and structured to capture an image of an intensity distribution of an interference pattern formed due to the illumination light that has interacted with the specimen, and to output image data; a defect information acquisition unit structured to acquire defect position information that indicates a position of a defective pixel of the image sensor; and a processing unit structured to reconstruct a subject image that represents the subject based on the image data and the defect position information.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A through 5D are diagrams each showing a subject image reconstructed by a modified algorithm;

DETAILED DESCRIPTION OF THE INVENTION

Figure 1:
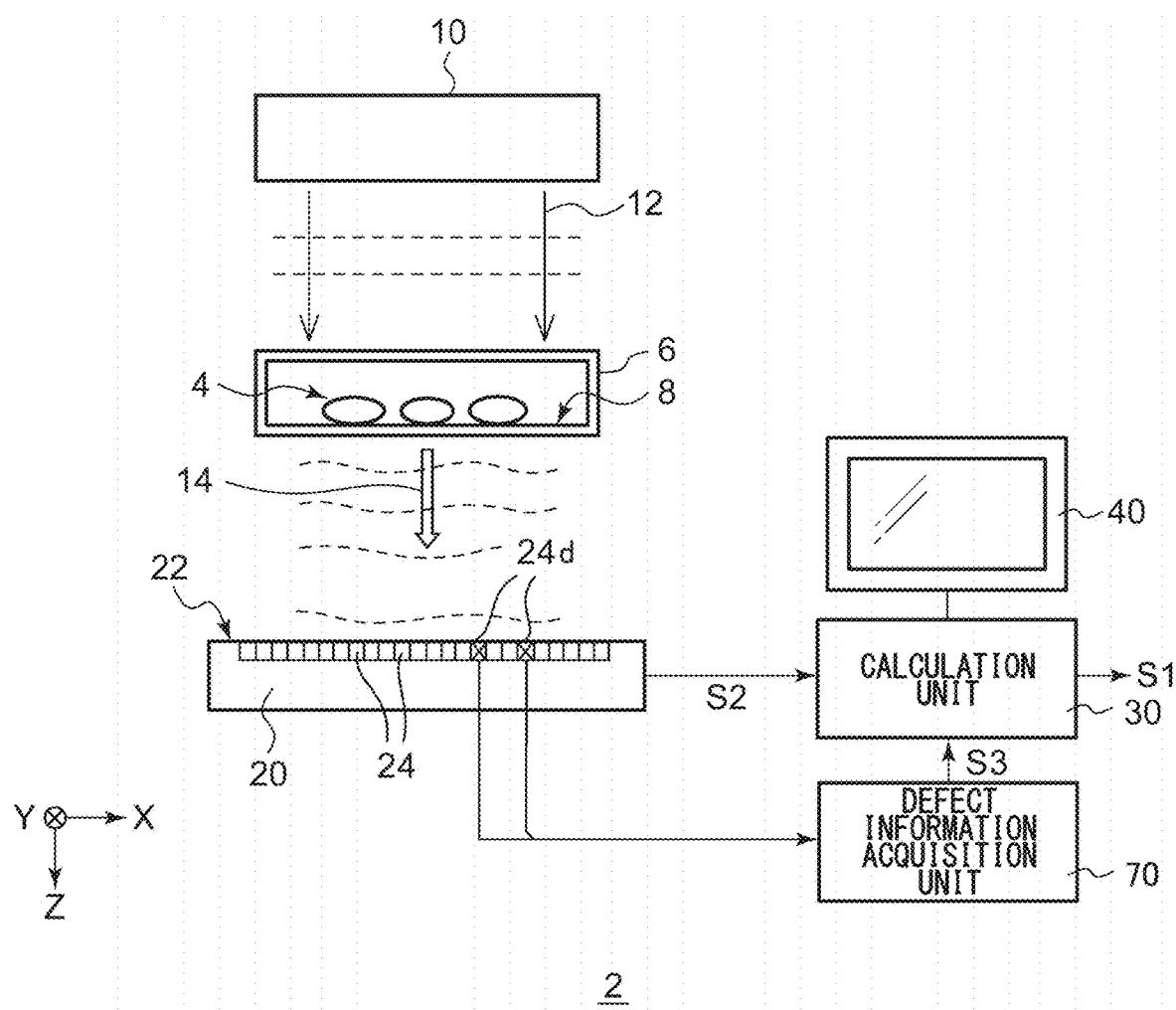
FIG. 1 is a diagram showing a basic configuration of a digital holographic imaging apparatus according to an embodiment.

The invention will now be described based on preferred embodiments which do not intend to limit the scope of the present invention but exemplify the invention. All of the features and the combinations thereof described in the embodiment are not necessarily essential to the invention.

SUMMARY

First, description will be made regarding a summary of several embodiments according to the present invention.

An embodiment of the present invention relates to a digital holographic imaging apparatus. The digital holographic imaging apparatus comprises: an illumination unit structured to emit an illumination light to a specimen; an image sensor comprising multiple pixels arranged in a two-dimensional manner, and structured to capture an image of an intensity distribution of an interference pattern formed due to the illumination light that has interacted with the specimen, and to output image data; a defect information acquisition unit structured to acquire defect position information that indicates a position of a defective pixel of the image sensor; and a processing unit structured to reconstruct a subject image that represents the subject based on the image data and the defect position information.

This embodiment is capable of suppressing degradation in the image quality that occurs due to defective pixels.

Also, the processing unit may use the defect position information in an iterative calculation loop for reconstructing the subject image. By removing the effects of defective pixels for every iterative calculation in the iterative calculation loop, this arrangement is capable of further suppressing degradation in the image quality.

Also, the defect information acquisition unit may comprise a defect position storage unit structured to store the position of a defective pixel specified before measurement of the specimen.

Also, the defect information acquisition unit may specify the positions of defective pixels based on an output of the image sensor. Also, the defect information acquisition unit may spatially differentiate the output of the image sensor so as to specify the positions of defective pixels. Also, the defect information acquisition unit may specify the positions of defective pixels based on the pixel value of each pixel acquired when the illumination light is emitted with a predetermined intensity.

In iterative calculation by means of the processing unit for reconstructing the subject image, the intensity of the image data may be used for the non-defective pixels (normal pixels), and the intensity acquired in a previous iterative calculation may be used for the defective pixels.

Also, the iterative calculation for reconstructing the subject image may comprise: calculating a complex amplitude on a second face on which the specimen is positioned based on a complex amplitude on a first face on which the image sensor is positioned; updating the complex amplitude on the second face under a predetermined constraint condition; calculating the complex amplitude on the first face based on the updated complex amplitude on the second face; and updating the complex amplitude on the first face, wherein an intensity of a non-defective pixel is replaced by an intensity of a corresponding pixel of the image data, and maintaining an intensity of a defective pixel.

Also, the processing unit may employ interpolated image data acquired by interpolating an intensity of a defective pixel of the image data based on intensities of surrounding pixels as an initial image before entering an iterative calculation loop for reconstructing the subject image.

Embodiments

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

FIG. 1 is a diagram showing a basic configuration of a digital holographic imaging apparatus 2 according to an embodiment. In some cases, the sizes (thickness, length, width, and the like) of each component shown in the drawings are expanded or reduced as appropriate for ease of understanding. The size relation between multiple components in the drawings does not necessarily match the actual size relation between them. That is to say, even in a case in which a given member A has a thickness (length) that is larger than that of another member B in the drawings, in some cases, in actuality, the member A has a thickness (length) that is smaller than that of the member B.

The digital holographic imaging apparatus 2 can be used to observe a phase object, an amplitude object, and an object having both characteristics. That is to say, the observation target is not restricted in particular. Description will be made in the present embodiment regarding an example in which a phase object such as cells is employed as an observation target (specimen 4). The specimen 4 is held at a predetermined position by means of a sample holder 6. The face on which the specimen 4 is positioned will be referred to as a "sample surface 8" (which will also be referred to as a "sample surface 8"). The digital holographic imaging apparatus 2 outputs a subject image S1 that represents the phase distribution of the specimen 4.

The digital holographic imaging apparatus 2 includes an illumination unit 10, an image sensor 20, a processing unit 30, a display apparatus 40, and a defect information acquisition unit 70. The digital holographic imaging apparatus 2 can be configured as a lens-free optical system. However, the digital holographic imaging apparatus 2 may include an unshown optical system as necessary.

The illumination unit 10 emits coherent illumination light 12 to the specimen 4. The configuration of the illumination unit 10 is not restricted in particular. The illumination unit 10 may be configured as a semiconductor laser or an LED. The illumination light 12 may be generated as plane-wave light or spherical-wave light. FIG. 1 shows an example in which the illumination light 12 is generated as plane-wave light. In the drawings, the light beams are each represented by a solid line, and the wave fronts are each represented by a dotted line.

Figure 2:
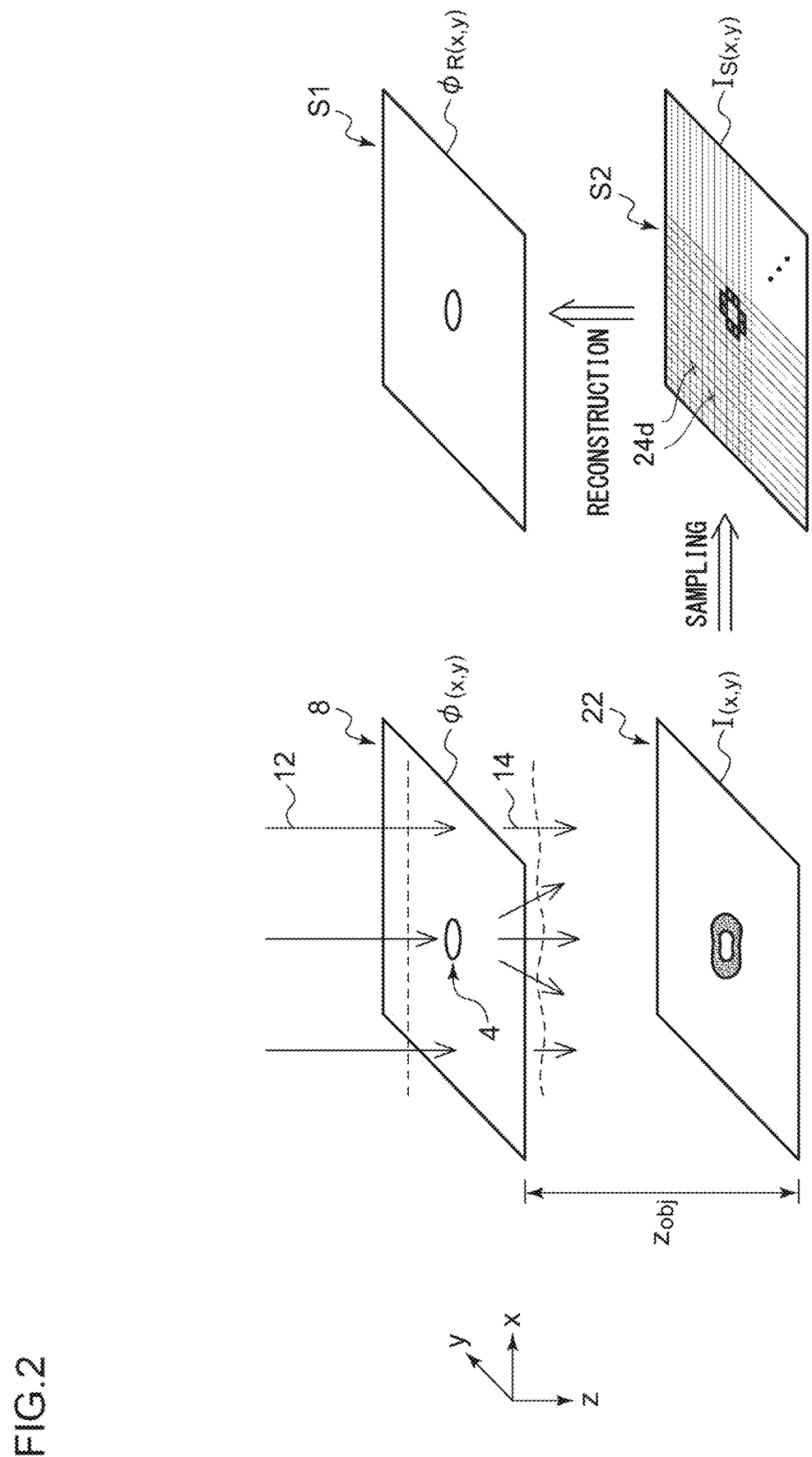
FIG. 2 is a diagram for explaining the principle of the digital holographic imaging apparatus.

FIG. 2 is a diagram for explaining the principle of the digital holographic imaging apparatus 2. The specimen 4 which is a phase object has a phase distribution $\phi(x, y)$ defined in a first direction (x direction) and a second direction (y direction) that is orthogonal to the first direction on the sample surface 8. The phase distribution $\phi(x, y)$ corresponds to the shape, structure, composition, or the like, of the specimen 4. The phase distribution $\phi(x, y)$ is to be observed by means of the digital holographic imaging apparatus 2. The illumination light 14 that passes through the specimen 4 undergoes phase shifting corresponding to the phase distribution $\phi(x, y)$, and accordingly, the wave fronts thereof are disturbed by the specimen 4. The illumination light 14 that has passed through the specimen 4 includes light that has not been disturbed (diffracted) by the specimen 4 and light diffracted by the specimen 4. These lights propagate at a distance of $Z_{obj}$ in the z direction, and generate an interference pattern (which will also be referred to as the "light intensity distribution") $I(x, y)$ on an imaging surface (photoelectric conversion face) 22 of the image sensor 20.

Returning to FIG. 1, the image sensor 20 is configured as a CCD (Charge Coupled Device), a CMOS (Complementary Metal Oxide Semiconductor) sensor, or the like. The image sensor 20 includes multiple pixels 24 arranged on the imaging surface 22 in a two-dimensional manner. The image sensor 20 captures an image of the intensity distribution $I(x, y)$ of the interference pattern generated by the illumination light 14 that has interacted with the specimen 4, and generates image data S2. As shown in FIG. 2, imaging by means of the image sensor 20 is none other than spatial sampling. The intensity distribution thus sampled (quantized) will be represented by $I_S(x, y)$. The image data S2 output from the image sensor 20 is input to the processing unit 30.

The defect information acquisition unit 70 acquires defect position information S3 that indicates the positions of defective pixels 24d of the image sensor 20. It should be noted that examples of such defect position information S3 that can be employed include: (i) a list of x-coordinate positions and y-coordinate positions of defective pixels; and (ii) a pixel map (frame data) in which a defective pixel is indicated by "1" (or otherwise "0"), and a normal pixel is indicated by "0" (or otherwise "1"). Also, (iii) an arrangement may be made in which serial numbers are assigned to all the pixels, and the serial numbers of defective pixels are listed. As described above, the data format of the defect position information S3 is not restricted in particular.

The processing unit 30 reconstructs the subject image S1 that represents the specimen 4 by calculation based on the image data S2 and the defect position information S3. Specifically, the processing unit 30 reconstructs the subject image S1 that represents a phase distribution $\phi_R(x, y)$ by calculation based on the intensity distribution $I_S(x, y)$ represented by the image data S2. The phase distribution $\phi_R(x, y)$ thus reconstructed corresponds to the phase distribution $\phi(x, y)$ of the specimen 4. It should be noted that the processing unit 30 and the defect information acquisition unit 70 may be configured as a combination of a general-purpose computer and a software program. Also, the processing unit 30 and the defect information acquisition unit 70 may each be configured as a dedicated hardware component. For example, a phase retrieval method (Fourier iterative method) or the like can be employed to reconstruct the subject image S1, for example.

The display apparatus 40 displays the subject image S1 generated by the processing unit 30. Furthermore, the display apparatus 40 has a function as a user interface of the digital holographic imaging apparatus 2.

Description will be made regarding the reconstruction calculation employed in the processing unit 30. The image data S2 acquired by the image sensor 20 represents the light intensity distribution $I_S(x, y)$ on the imaging surface 22. The light intensity distribution $I_S(x, y)$ includes light amplitude information $\sqrt{I_S(x, y)}$. However, the light phase information is missing. The reconstruction calculation is none other than restoring the missing phase information so as to reproduce the phase distribution $\phi(x, y)$ on the sample surface 8.

Figure 3:
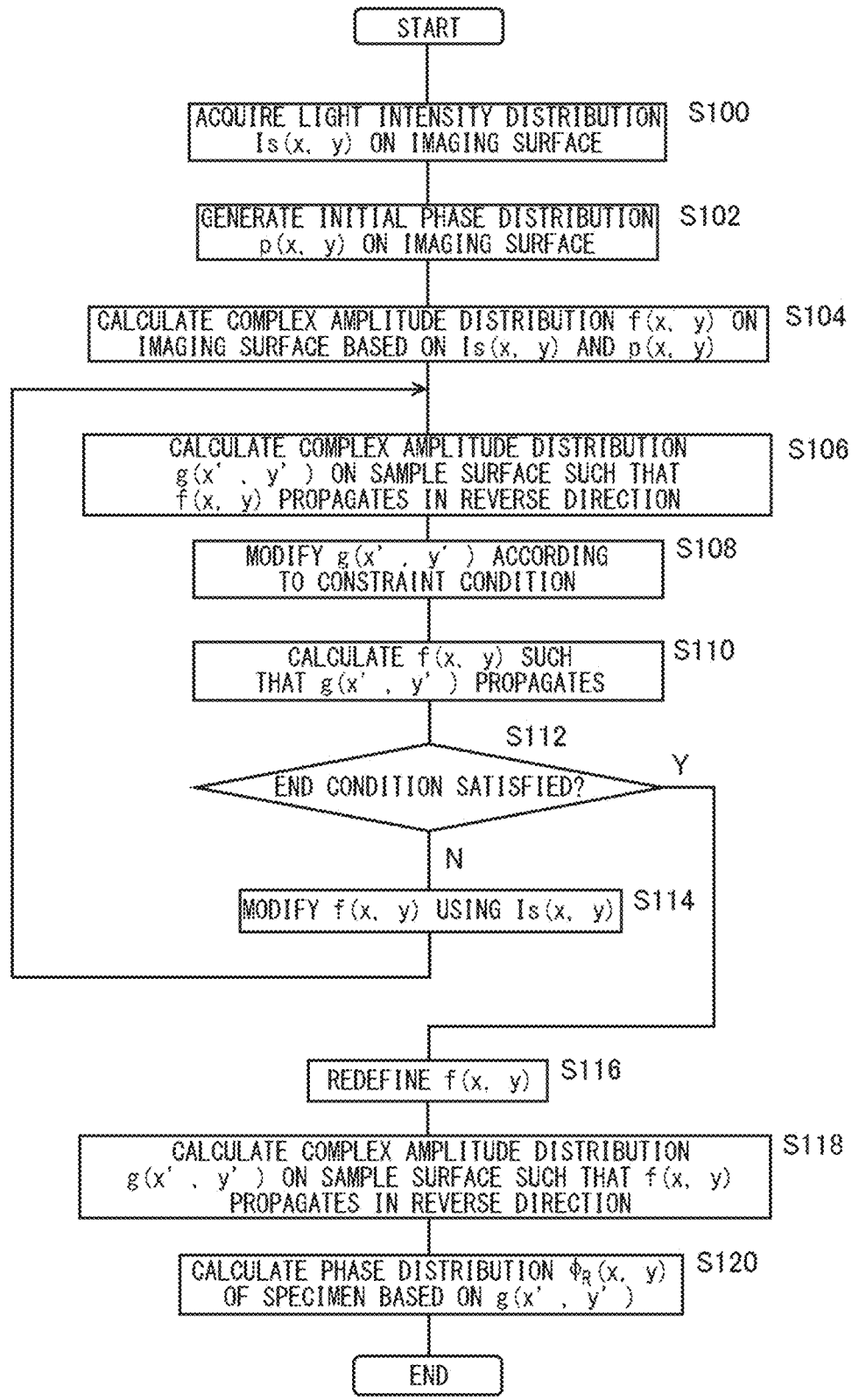
FIG. 3 is a flowchart showing reconstruction calculation employed in the processing unit.

FIG. 3 is a flowchart showing the reconstruction calculation employed in the processing unit 30. For ease of understanding and for simplicity of description, in the first description, description will be made without giving consideration to the effects of defective pixels. The processing unit 30 receives, as input data, the image data S2 that represents the light intensity distribution $I_S(x, y)$ formed on the imaging surface (first face) 22 (S100). Next, the phase distribution p(x, y) on the imaging surface 22 is set to an initial value (S102). Here, the initial value of the phase distribution p(x, y) may be configured as a random value. In this stage, the complex amplitude distribution f(x, y) is calculated based on the following Expression (1) (S104).

[Expression 1]

$$f(x, y) = \sqrt{I_S(x, y)} \exp\left(i\frac{2\pi}{\lambda} p(x, y)\right) \quad (1)$$

Next, the complex amplitude distribution g(x', y') on the sample surface (second face) 8 is calculated such that the complex amplitude distribution f(x, y) on the imaging surface 22 propagates at a distance $z_{obj}$ toward the negative side in the z-axis direction (S106). As the calculation in this step, a Fresnel integral expression (2) may be employed. It should be noted that the following Expression (2) is obtained using approximation assuming that the propagation distance z is large to some extent. However, g(x', y') may be calculated without using such approximation.

[Expression 2]

$$g(x', y') = \left(\frac{1}{i\lambda(-z)}\right) \int f(x, y) \exp\left(\frac{i2\pi}{\lambda}\left(-z + \frac{(x-x')^2 + (y-y')^2}{2 \cdot (-z)}\right)\right) dx dy \quad (2)$$

Next, the complex amplitude distribution g(x', y') on the sample surface 8 is modified and updated based on constraint conditions for the sample surface 8 (S108). For example, in a case in which the specimen 4 is a phase object, a constraint condition in which the phase distribution is constant can be employed. Accordingly, the amplitude information represented by g(x', y') is eliminated based on the following Expression (3), thereby normalizing the amplitude.

[Expression 3]

$$g(x', y') \leftarrow \exp\left(i\frac{2\pi}{\lambda} \arg(g(x', y'))\right) \quad (3)$$

Here, "arg( )" represents the phase of the complex number.

Subsequently, the complex amplitude distribution f(x, y) on the imaging surface 22 is calculated such that the complex amplitude g(x', y') obtained in Step S108 propagates at a distance $z_{obj}$ in the z-axis direction (S110). As this calculation, the following Fresnel integral expression (4) may be employed.

[Expression 4]

$$f(x, y) = \left(\frac{1}{i \cdot \lambda \cdot z}\right) \int g(x', y') \exp\left(\frac{i2\pi}{\lambda}\left(z + \frac{(x'-x)^2 + (y'-y)^2}{2 \cdot z}\right)\right) dx' dy' \quad (4)$$

Subsequently, judgment is made whether or not a predetermined end condition is satisfied (S112). The end condition is not restricted in particular. For example, in a case in which the number of iterations of the iterative calculation reaches a predetermined number, judgement may be made that the end condition has been satisfied. Also, the intensity distribution $I(x, y) = f(x, y) \cdot f^*(x, y)$ may be calculated based on the complex amplitude distribution obtained in Step S110. In this case, in a case in which the difference between the intensity distribution I(x, y) thus calculated and the intensity distribution represented by the image data S2 becomes equal to or smaller than a predetermined value, judgement may be made that the end condition has been satisfied. Here, "f*(x, y)" represents the complex conjugation of f(x, y). Also, in a case in which the amplitude distribution of the complex amplitude distribution g(x', y') obtained in Step S106 has sufficient uniformity, judgment may be made that the end condition has been satisfied.

When the end condition has not been satisfied in Step S112 (NO in Step S112), the complex amplitude distribution f(x, y) is modified and updated using the light intensity distribution $I_S(x, y)$ of the measured image data S2. Specifically, according to the following Expression (5), the amplitude distribution is replaced by the amplitude distribution $\sqrt{I_S(x, y)}$ derived from the intensity distribution $I_S(x, y)$ acquired in the amplitude distribution measurement while maintaining the phase distribution.

[Expression 5]

$$f(x, y) \leftarrow \sqrt{I_s(x, y)} \exp\left(i\frac{2\pi}{\lambda} \arg(f(x, y))\right) \quad (5)$$

When the end condition has been satisfied in Step S112 (YES in S112), the complex amplitude distribution f(x, y) on the imaging surface 22 is redefined (S116). The complex amplitude distribution g(x', y') on the sample surface 8 is calculated such that the complex amplitude distribution f(x, y) on the imaging surface 22 thus redefined propagates toward the sample surface 8 (S118). Subsequently, the phase distribution $\phi_R(x, y)$ of the specimen 4 is calculated based on the complex amplitude distribution g(x', y') according to the following Expression (6) (S120). The phase distribution $\phi_R(x, y)$ represents the subject image S1 to be acquired.

$$\phi_R(x,y)=\arg(g(x',y')) \quad (6).$$

The above is the calculation operation of the processing unit 30 using the phase retrieval method.

Figure 4A:
FIGS. 4A through 4C are diagrams each showing the effects of defective pixels.
Figure 4B:
Figure 4C:
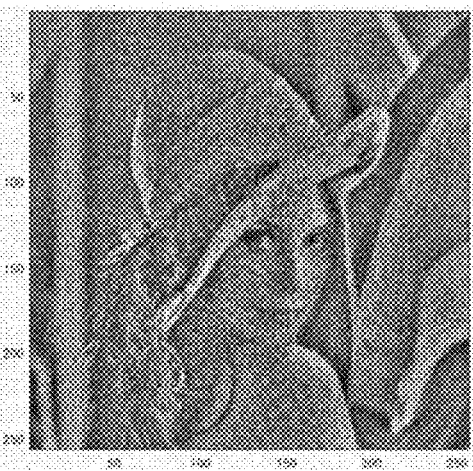

As described above, the light intensity distribution $I_S(x, y)$ is used in the Expressions (1) and (5), i.e., in the step S104 which is a step preceding the iterative calculation steps S106 through S114, and in the step S114 which is a step executed in the iterative calculation loop. Accordingly, the defective pixels have effects on the calculation in these steps. FIGS. 4A through 4C are diagrams for explaining the effects of defective pixels. The subsequent drawings show simulation results. FIG. 4A shows an original image (phase distribution $\phi(x, y)$).

FIG. 4B shows a subject image reconstructed based on the flowchart shown in FIG. 3 in a case in which there are no defective pixels. From a comparison between FIGS. 4A and 4B, it can be understood that the algorithm employed in the simulation based on the flowchart shown in FIG. 3 is confirmed to be correct.

The simulation was calculated assuming that 1% of the total pixels of the image sensor 20 are defective pixels. FIG. 4C shows a subject image reconstructed based on the flowchart shown in FIG. 3 in a case in which there are such defective pixels. It can clearly be understood that image quality degradation occurs in the subject image shown in FIG. 4C as compared with the subject image shown in FIG. 4B A digital holographic imaging apparatus 2 according to an embodiment employs an algorithm modified based on the algorithm shown in FIG. 3. The modified algorithm uses the defect position information S3 so as to provide the subject image with improved image quality. Description will be made below regarding several modified algorithms.

First Modified Algorithm

Figure 6:
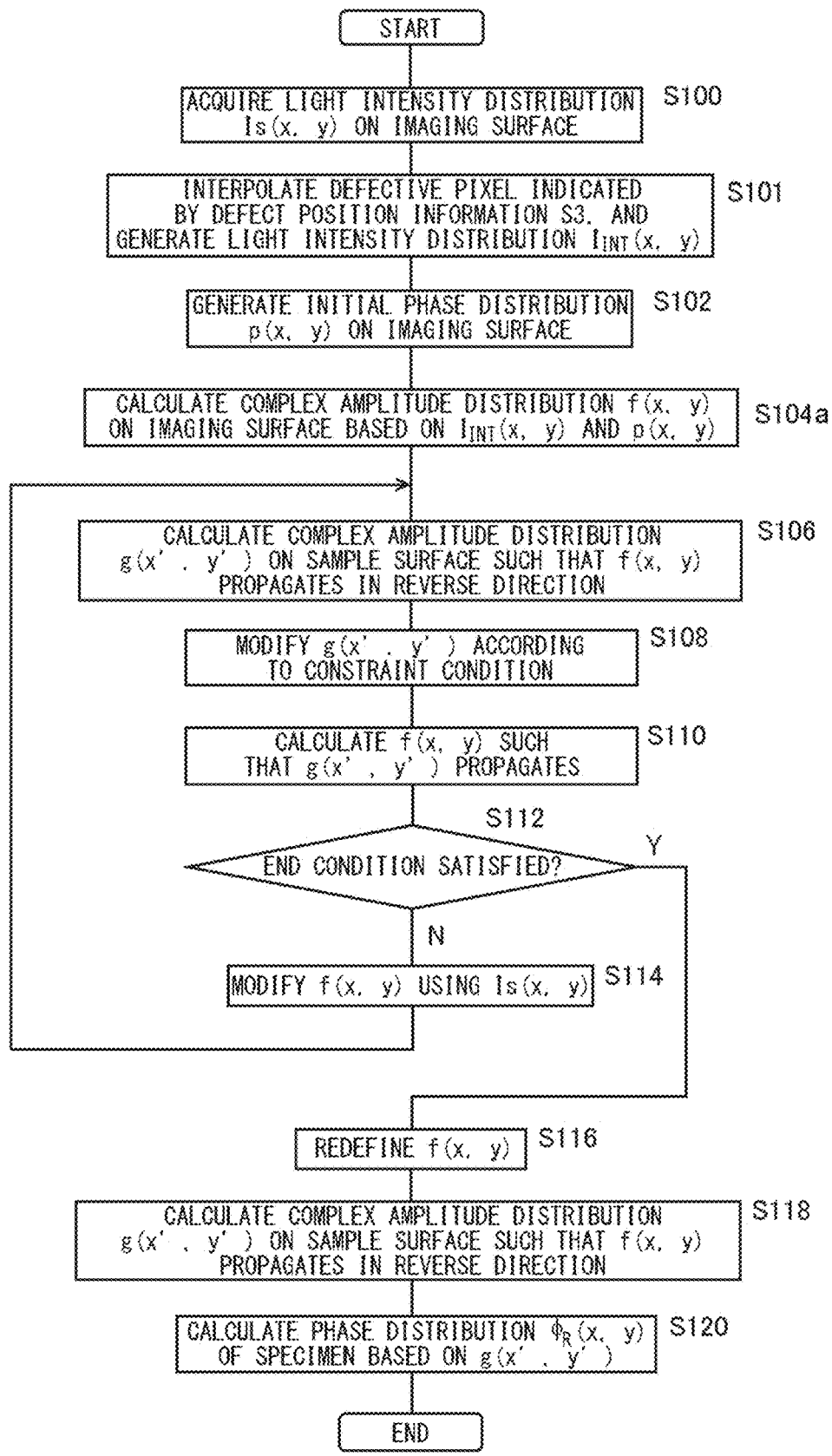
FIG. 6 is a flowchart showing a first modified flowchart.

FIG. 6 is a flowchart showing a first modified algorithm. This flowchart further includes an interpolation step S101 in addition to the flowchart shown in FIG. 3. In the interpolation step S101, the intensities of defective pixels in the intensity distribution $I_S(x, y)$ represented by the image data S2 is interpolated based on the intensities of the surrounding non-defective pixels, thereby generating the interpolated image data $I_{INT}(x, y)$. Subsequently, instead of the original light intensity distribution $I_S(x, y)$, the interpolated image data $I_{INT}(x, y)$ is used as an initial image before entering the iterative calculation loop. Specifically, in Step S104a, the complex amplitude distribution f(x, y) is calculated based on the interpolated image data $I_{INT}(x, y)$ and p(x, y). With the first modified algorithm, in Step S114 in the iterative calculation loop, the measured light intensity distribution $I_S(x, y)$ is used without change.

Figure 7:
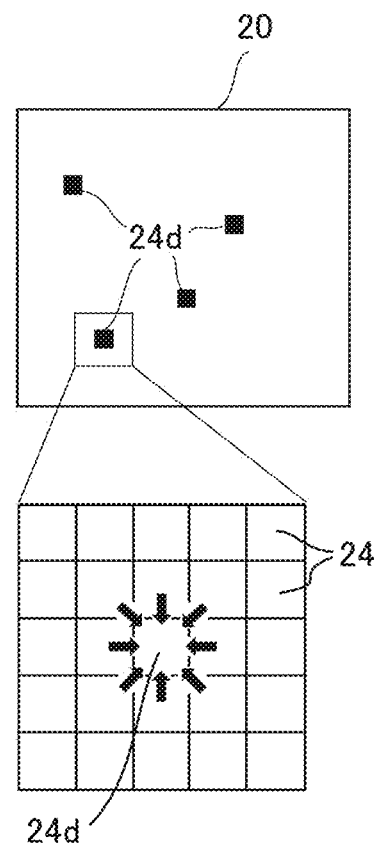
FIG. 7 is a diagram for explaining the generation of interpolated image data $I_{INT}(x, y)$.

FIG. 7 is a diagram for explaining the generation of the interpolated image data $I_{INT}(x, y)$. The position of each defective pixel 24d in the image sensor 20 can be acquired from the defect position information S3. The pixel values of defective pixels 24d are calculated by interpolation processing based on the pixel values of the surrounding normal pixels. FIG. 7 shows the interpolation processing based on eight normal pixels surrounding a defective pixel 24d. However, the present invention is not restricted to such an arrangement. Also, defective pixels may be interpolated with reference to the pixel values of normal pixels adjacent to the defective pixel in the horizontal direction and in the vertical direction. That is to say, the normal pixels adjacent to the defective pixel in the diagonal directions are not employed. Also, as the reference pixels, the normal pixels adjacent to the defective pixel only in the horizontal direction or otherwise only in the vertical direction may be employed. Also, the number of reference pixels of which the pixel values are to be used for the interpolation may be greater than eight.

FIG. 5A is a diagram showing a subject image reconstructed based on the first modified algorithm. In comparison with the subject image shown in FIG. 4C, it can be confirmed that the first algorithm provides the reconstructed subject image with slightly improved image quality.

Second Modified Algorithm

Figure 8:
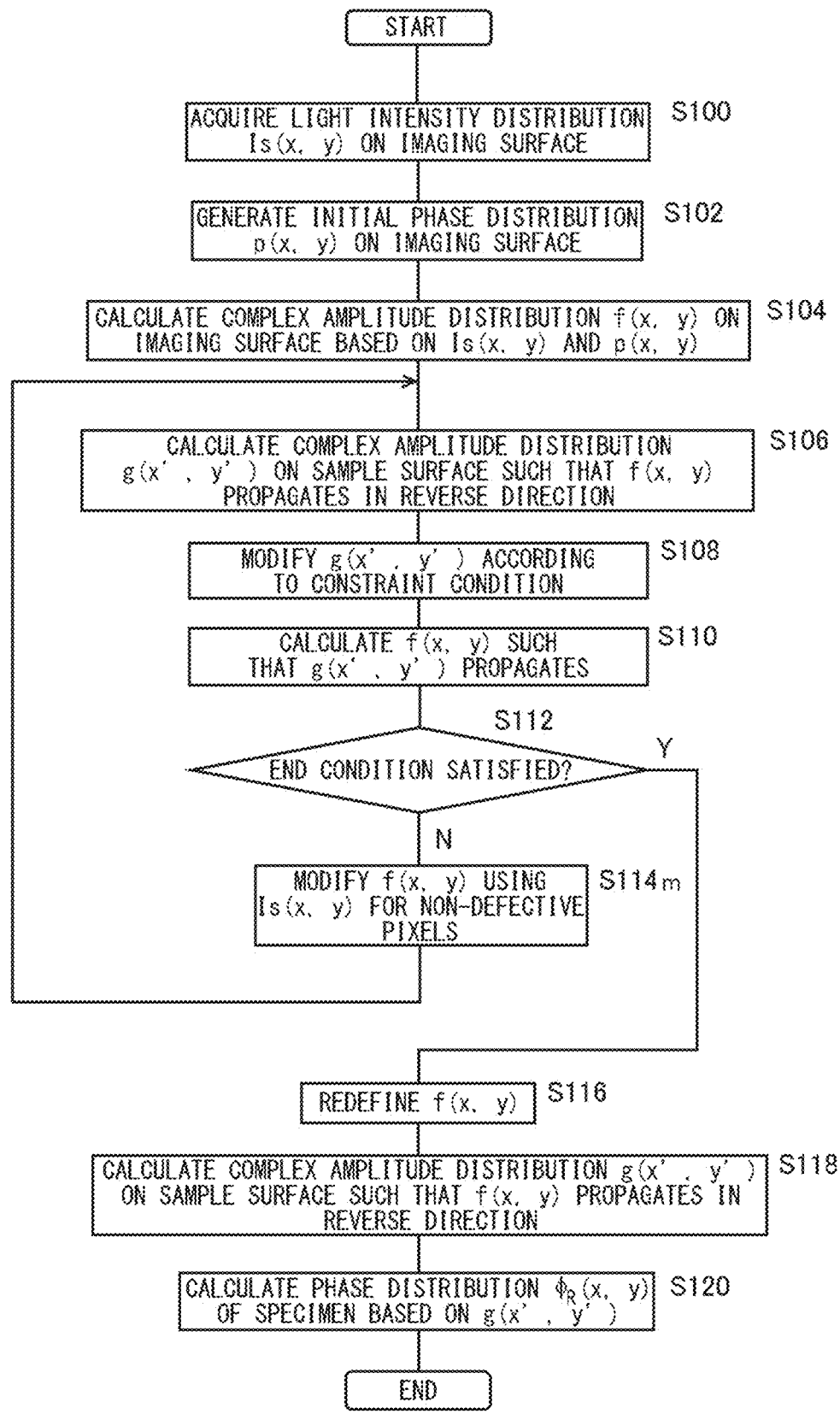
FIG. 8 is a flowchart showing a second modified algorithm.

FIG. 8 is a flowchart showing a second modified algorithm. With the second modified algorithm, the defect position information S3 is used in the iterative calculation loop. In the flowchart shown in FIG. 8, the step S114 shown in FIG. 3 is modified. In the step S114 before the modification, the intensity is replaced for all the pixels including the defective pixels. In contrast, in the modified step S114m, the defective pixels are specified with reference to the defect position information S3. Non-defective pixels are replaced by the intensity distribution $I_S(x, y)$ of the image data S2 in the same way as in Step S114. In contrast, defective pixels are not replaced. That is to say, for defective pixels, the intensity acquired in the previous iterative calculation is used.

FIG. 5B is a diagram showing a subject image reconstructed based on the second modified algorithm. In comparison with the reconstructed subject image shown in FIG.

4C, it can be confirmed that the second modified algorithm provides the reconstructed subject image with markedly improved image quality.

Third Modified Algorithm

Figure 9:
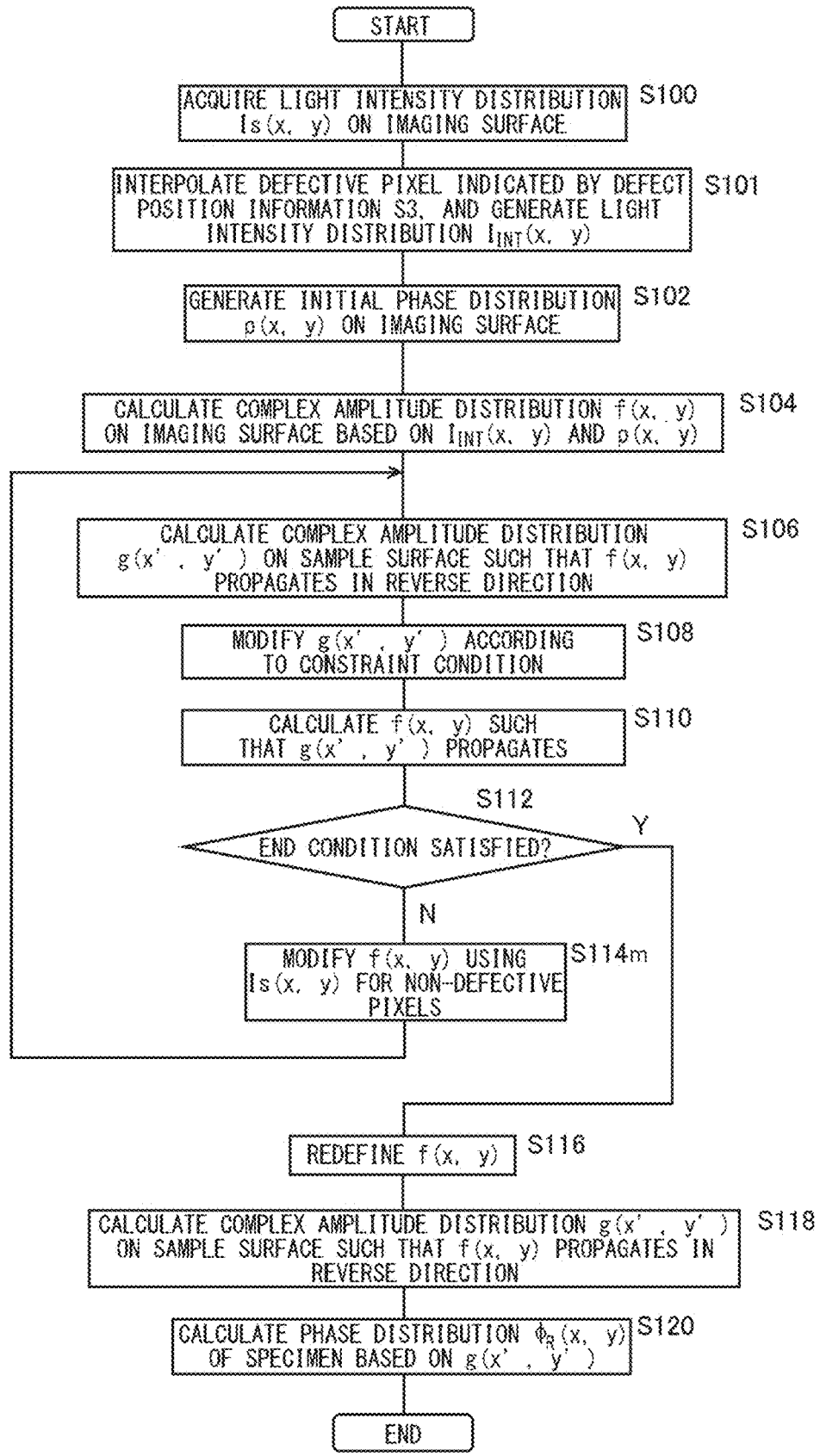
FIG. 9 is a flowchart showing a third modified algorithm.

FIG. 9 is a flowchart showing a third modified algorithm. The third modified algorithm can be regarded as a combination of the first modified algorithm and the second modified algorithm. That is to say, in the interpolation step S101 before entering the iterative calculation loop, the interpolated image data $I_{INT}(x, y)$ is generated. The interpolated image data $I_{INT}(x, y)$ thus generated is used as the initial image before entering the iterative calculation loop.

Furthermore, in the step S114m in the iterative calculation loop, the pixel values of non-defective pixels are replaced using the intensity distribution $I_S(x, y)$ of the image data S2 in the same way as in the step S114. In contrast, the pixel values of defective pixels are not replaced. Instead, the intensity value acquired in the previous iterative calculation is used for defective pixels.

FIG. 5C is a diagram showing a subject image reconstructed based on the third modified algorithm. In comparison with the reconstructed subject image shown in FIG. 4C, it can be confirmed that the third modified algorithm provides the reconstructed subject image with markedly improved image quality. By using the interpolated image data $I_{INT}(x, y)$, the third modified algorithm requires only a smaller number of iterations of the iterative calculation than that required in the second modified algorithm to provide such high image quality.

Fourth Modified Algorithm

Figure 10:
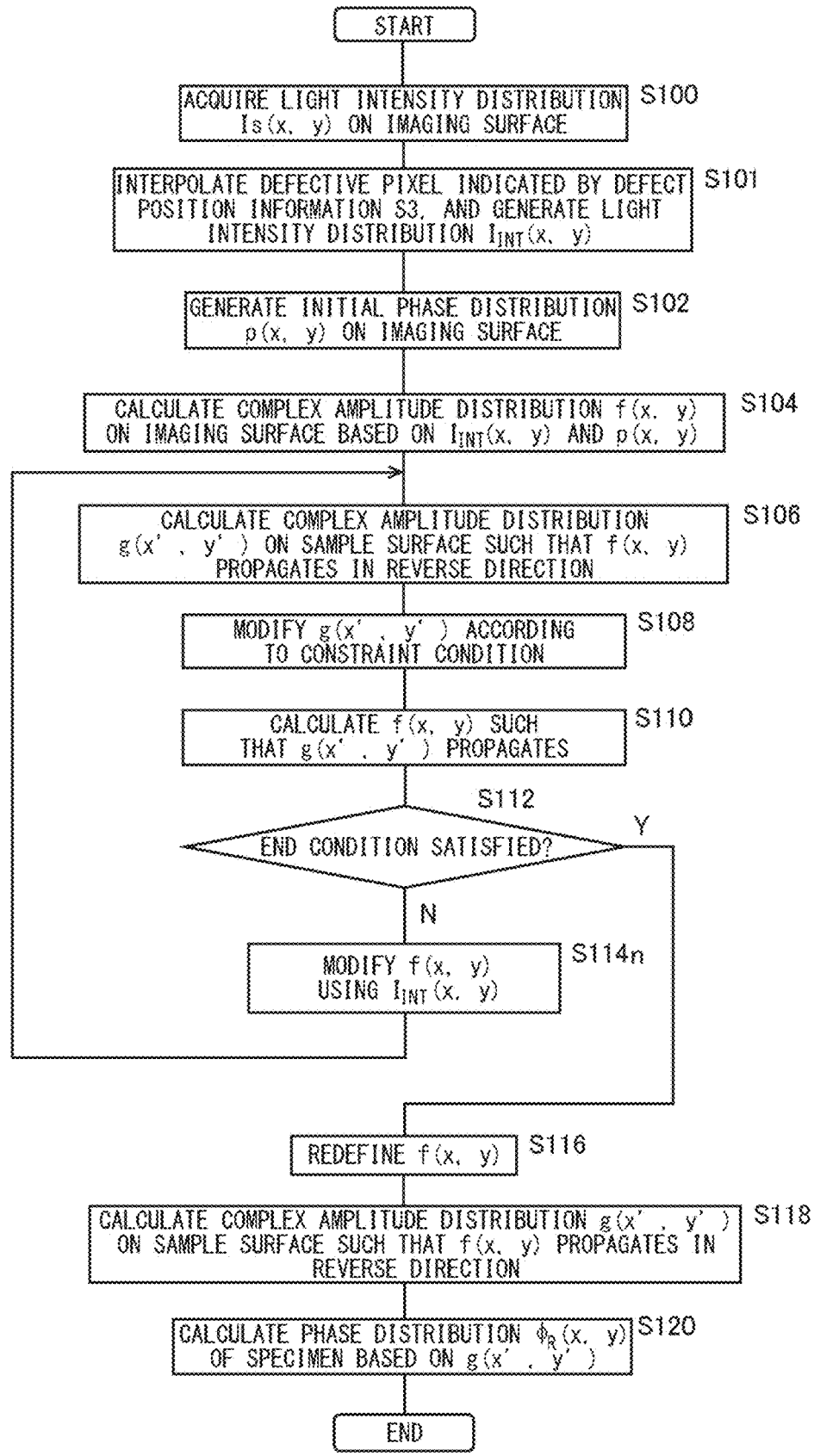
FIG. 10 is a flowchart showing a fourth modified algorithm.

FIG. 10 is a flowchart showing a fourth modified algorithm. With the fourth modified algorithm, in the interpolation step S101 before entering the iterative calculation loop, the interpolated image data $I_{INT}(x, y)$ is generated, which is used as the initial image before entering the iterative calculation loop. Furthermore, in Step S114n in the iterative calculation loop, all the pixels are replaced using the interpolated image data $I_{INT}(x, y)$.

FIG. 5D is a diagram showing a subject image reconstructed based on the fourth modified algorithm. In comparison with the reconstructed subject image shown in FIG. 4C, it can be confirmed that the fourth modified algorithm provides the reconstructed subject image with markedly improved image quality.

Comparing the reconstructed subject images shown in FIGS. 5A through 5D, it can be understood that the reconstructed subject images obtained based on the second through fourth modified algorithms shown in FIGS. 5B through 5C exhibit markedly improved image quality. That is to say, it can be understood that it is very effective for improvement of image quality to use the defect position information S3 in the reconstruction calculation loop. In addition, by using the defect position information S3 in the step for generating the initial image before entering the calculation loop, this arrangement is capable of providing high image quality as shown in FIGS. 5C and 5D.

Even in a case in which the defect position information S3 is used only in the step for generating the initial image before entering the calculation loop, this arrangement is capable of providing improved image quality as shown in FIG. 5A.

The above are the effects of using the defect position information S3 for improvement of image quality.

Figure 11:
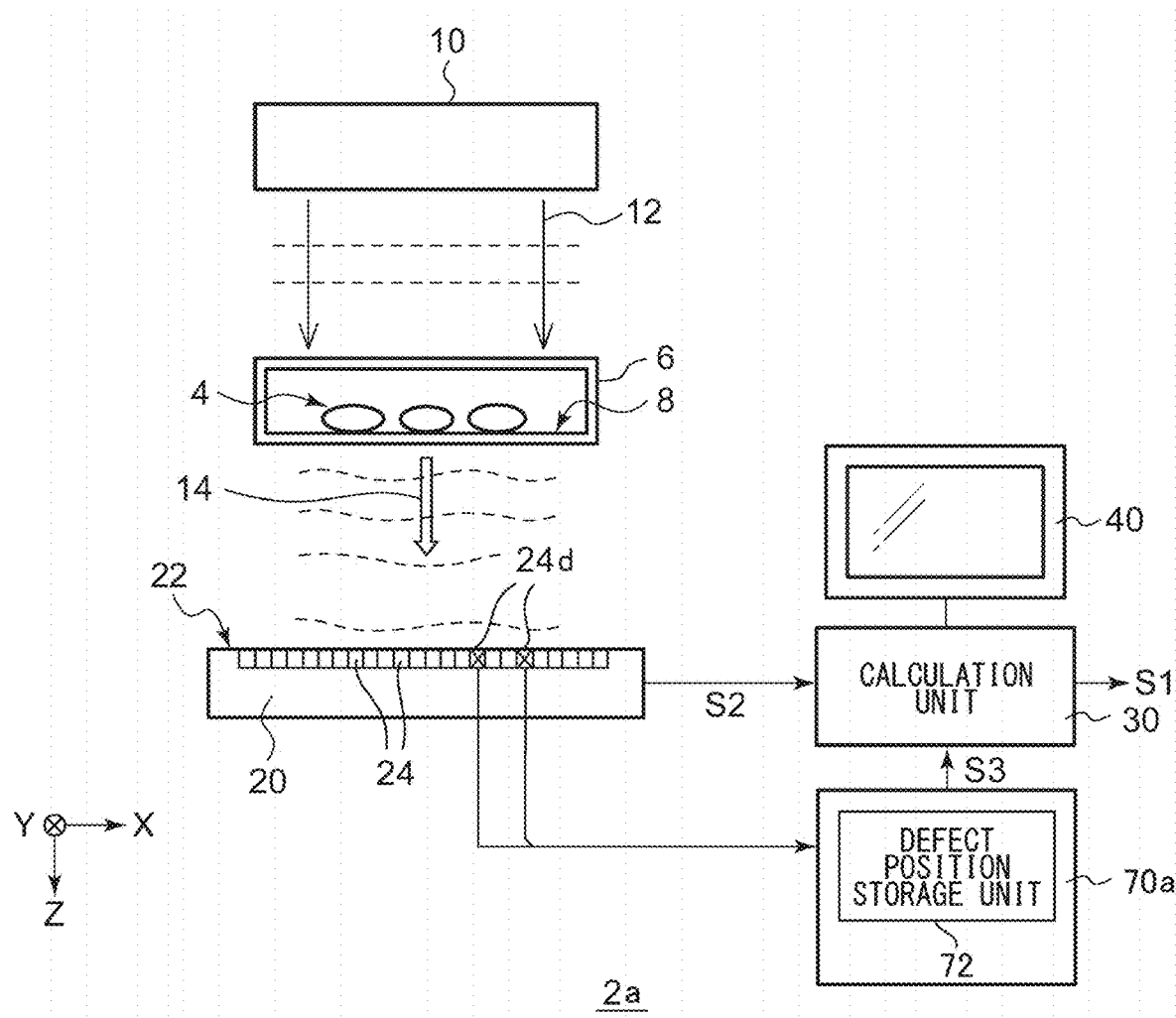
FIG. 11 is a diagram showing a first example configuration of the digital holographic imaging apparatus.

Next, description will be made regarding the generation or acquisition of the defect position information S3. FIG. 11 is a diagram showing a first example configuration (2a) of the digital holographic imaging apparatus. A defect information acquisition unit 70a includes a defect position storage unit 72. In this example configuration, the positions of defective pixels are specified before the measurement of the specimen 4. The defect position information S3 is stored in the defect position storage unit 72.

The positions of defective pixels may be specified in an inspection step after manufacturing the image sensor 20, for example. Accordingly, the defective pixel position information may preferably be received from the vendor of the image sensor 20, and may preferably be stored in the defect position storage unit 72. Alternatively, in a manufacturing step for the digital holographic imaging apparatus 2, the positions of defective pixels of the image sensor 20 may be specified, and the defect position information S3 may be stored in the defect information acquisition unit 70.

Figure 12:
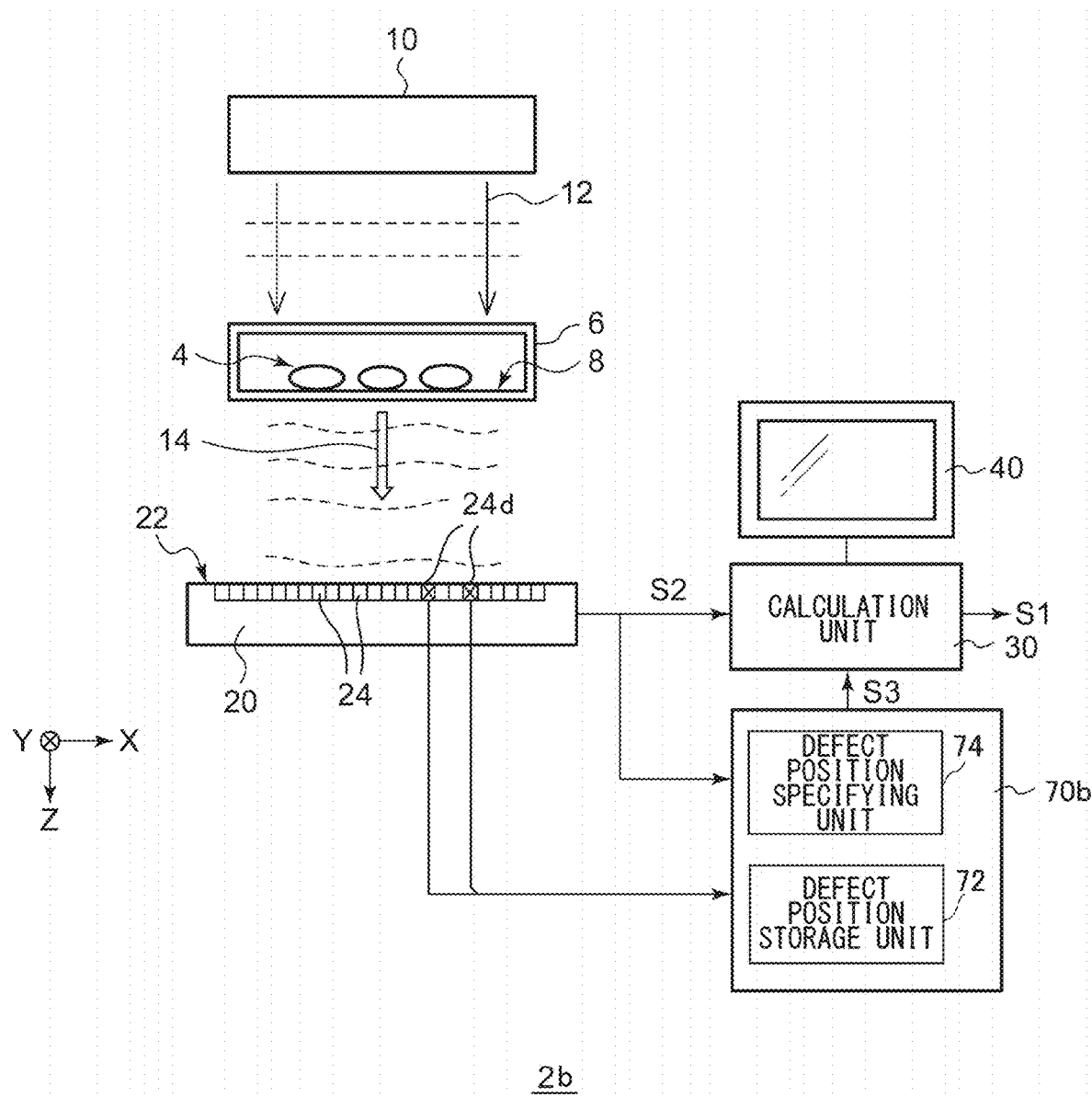
FIG. 12 is a diagram showing a second example configuration of the digital holographic imaging apparatus.

FIG. 12 is a diagram showing a second example configuration (2b) of the digital holographic imaging apparatus. A defect information acquisition unit 70b specifies the positions of defective pixels based on an output image of the image sensor 20 in the manufacturing step for the digital holographic imaging apparatus 2 or otherwise after shipping. That is to say, this arrangement takes into account defective pixels that have occurred due to aging degradation in addition to the defective pixels that have occurred in the manufacturing step for the image sensor 20.

For example, the defect information acquisition unit 70b includes the defect position storage unit 72. The defect position storage unit 72 specifies the positions of defective pixels based on an output image of the image sensor 20. The positions of defective pixels thus obtained are written to the defect position storage unit 72.

In a region including a defective pixel, in some cases, such a defective pixel exhibits the maximum value (hot pixel), and in some cases, such a defective pixel exhibits the minimum value (dead pixel). Accordingly, the defect position storage unit 72 may spatially differentiate the output of the image sensor 20 so as to specify the positions of defective pixels. The absolute value of the differential value becomes large at the position of a defective pixel. Accordingly, by comparing the differential value with a threshold value, this arrangement is capable of specifying a defect position.

Alternatively, the pixel value of each pixel may be directly compared with a threshold value instead of the comparison between a differential value thereof and a threshold value, so as to specify defective pixels. For example, light may be emitted to the image sensor 20 with a predetermined intensity that corresponds to a middle range thereof. In this state, a pixel that exhibits the maximum pixel value or otherwise the minimum pixel value (or a value in the vicinity of the maximum or minimum pixel value) may be judged to be a defective pixel.

The defect position storage unit 72 may specify defective pixels based on the image data S2 captured for the observation of the specimen 4. In many cases, the interference pattern (intensity distribution $I_S(x, y)$) before the reconstruction, which is stored as the image data S2, has low contrast. Accordingly, before the start of the reconstruction calculation by means of the processing unit 30, the image data S2 may be spatially differentiated so as to specify a defect position. Alternatively, each pixel of the image data S2 may be compared with a threshold value so as to specify a defect position.

Also, another image may be captured in order to specify the defect positions in addition to the image captured for observing the specimen 4. Such an image is preferably captured under a condition that allows the defect positions to be specified in a simple manner. For example, the specimen 4 and the sample holder 6 may be removed so as to form a uniform intensity distribution on the imaging surface 22. The defect positions may be specified based on the image data of such a uniform intensity distribution. A defect position specifying unit 74 is capable of specifying the positions of defective pixels based on the pixel values of each pixel acquired when the illumination light 12 is emitted with a predetermined intensity (which may be set to zero) or otherwise a spatial differential value thereof.

For example, light may be emitted to the image sensor 20 with a light intensity that corresponds to a middle range thereof. In this state, when a pixel exhibits the maximum pixel value or otherwise the minimum pixel value (or a value in the vicinity of the maximum or minimum pixel value), the defect position specifying unit 74 may specify that such a pixel is a defective pixel. Also, light may be emitted with a light intensity such that saturation occurs in all the pixels. In this state, when a pixel exhibits a non-saturated pixel value, the defect position specifying unit 74 may specify that such a pixel is a defective pixel. Alternatively, in a completely dark state, a pixel that exhibits a non-zero pixel value may be specified as a defective pixel. It is needless to say that such a defective pixel may be specified based on a combination of image data measured under multiple conditions.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the specimen 4 is a phase object. Also, the specimen 4 may be an amplitude object that provides an intensity distribution. Also, the specimen 4 may provide both a phase distribution and an intensity distribution. In a case in which the specimen 4 is an amplitude object, the reconstruction can be calculated under a constraint condition in which the phase distribution is constant. In this case, the phase information of g(x', y') may be eliminated according to the Expression (7) thereby normalizing the phase.

$$g(x',y') \leftarrow \{g(x',y') \cdot g^*(x',y')\}^{1/2} \quad (7)$$

Description has been made in the embodiment regarding an arrangement in which the subject image $\phi_R(x, y)$ is reproduced from single image data S2. Also, the subject image $\phi_R(x, y)$ may be reproduced from multiple image data S2 measured under different conditions. Also, known algorithms may be employed.

Description has been made regarding the digital holographic imaging apparatus 2 that measures transmitted light that passes through the specimen 4. Also, the digital holographic imaging apparatus 2 may be configured as a type for measuring reflected light.

What is claimed is:

1. A digital holographic imaging apparatus comprising:
   an illumination light source structured to emit an illumination light to a specimen, wherein the illumination light is coherent;
   an image sensor comprising a plurality of pixels arranged in a two-dimensional manner, and structured to capture an image of an intensity distribution of an interference pattern formed due to the illumination light that has interacted with the specimen, and to output image data based on the captured image; and
   at least one processor configured to:
   acquire defect position information that indicates a position of a defective pixel of the image sensor; and
   reconstruct a subject image that represents the subject based on the image data and the defect position information,
   wherein the at least one processor is configured to perform an iterative calculation for reconstructing the subject image, and
   wherein the iterative calculation comprises:
   calculating a complex amplitude on a second face on which the specimen is positioned based on a complex amplitude on a first face on which the image sensor is positioned;
   updating the complex amplitude on the second face under a predetermined constraint condition;
   calculating the complex amplitude on the first face based on the updated complex amplitude on the second face; and
   updating the complex amplitude on the first face, wherein an intensity of a non- defective pixel is replaced by an intensity of a corresponding pixel of the image data, while maintaining an intensity of a defective pixel.

2. The digital holographic imaging apparatus according to claim 1, wherein the at least one processor is configured to use the defect position information in an iterative calculation loop for reconstructing the subject image, the iterative calculation loop comprising the iterative calculation.

3. The digital holographic imaging apparatus according to claim 1, further comprising a memory structured to store the position of a defective pixel specified before measurement of the specimen.

4. The digital holographic imaging apparatus according to claim 1, wherein the at least one processor is configured to specify positions of defective pixels based on an output of the image sensor.

5. The digital holographic imaging apparatus according to claim 4, wherein the at least one processor is configured to spatially differentiate the output of the image sensor so as to specify the positions of defective pixels.

6. The digital holographic imaging apparatus according to claim 4, wherein the at least one processor is configured to specify the positions of defective pixels based on a pixel value of each pixel acquired when the illumination light is emitted with a predetermined intensity.

7. The digital holographic imaging apparatus according to claim 1, wherein, in the iterative calculation by the at least one processor for reconstructing the subject image, an intensity of the image data is used for the non- defective pixels, and an intensity acquired in a previous iterative calculation is used for the defective pixels.

8. The digital holographic imaging apparatus according to claim 1,
   wherein the at least one processor is configured to employ interpolated image data acquired by interpolating an intensity of a defective pixel of the image data based on intensities of surrounding pixels as an initial image before entering an iterative calculation loop for reconstructing the subject image, the iterative calculation loop comprising the iterative calculation.

9. A method for capturing a subject image that represents a specimen, comprising:

emitting an illumination light to a specimen, wherein the illumination light is coherent;

capturing an image of an intensity distribution of an interference pattern formed due to the illumination light that has interacted with the specimen using an image sensor comprising a plurality of pixels arranged in a two-dimensional manner, and generating image data based on the captured image;

acquiring defect position information that indicates a position of a defective pixel in the image sensor; and reconstructing the subject image based on the image data and the defect position information, wherein an iterative calculation is performed for reconstructing the subject image, wherein the iterative calculation comprises:

calculating a complex amplitude on a second face on which the specimen is positioned based on a complex amplitude on a first face on which the image sensor is positioned;

updating the complex amplitude on the second face under a predetermined constraint condition;

calculating the complex amplitude on the first face based on the updated complex amplitude on the second face; and updating the complex amplitude on the first face, wherein an intensity of a non- defective pixel is replaced by an intensity of a corresponding pixel of the image data, while maintaining an intensity of a defective pixel.

* * * * *